United States Patent
Borin et al.

(10) Patent No.: US 11,428,622 B2
(45) Date of Patent: Aug. 30, 2022

(54) CATHODIC PROTECTION MEASUREMENT SYSTEM AND METHOD

(71) Applicant: Borin Manufacturing LLC, Culver City, CA (US)

(72) Inventors: Frank William Borin, Culver City, CA (US); Thomas Theissen, Marina Del Rey, CA (US)

(73) Assignee: Borin Manufacturing LLC, Culver City, CA (US)

( * ) Notice: Subject to any disclaimer, the term of this patent is extended or adjusted under 35 U.S.C. 154(b) by 248 days.

(21) Appl. No.: 16/522,606

(22) Filed: Jul. 25, 2019

(65) Prior Publication Data

US 2020/0033252 A1    Jan. 30, 2020

Related U.S. Application Data

(60) Provisional application No. 62/703,355, filed on Jul. 25, 2018.

(51) Int. Cl.
*G01N 17/02* (2006.01)
*G01N 17/04* (2006.01)

(52) U.S. Cl.
CPC .......... *G01N 17/02* (2013.01); *G01N 17/043* (2013.01)

(58) Field of Classification Search
CPC ...... G01N 17/043; G01N 17/02; G01N 17/04; G01R 27/02; G01R 19/0092; G01R 27/16; G01R 27/14; G01R 27/025
See application file for complete search history.

(56) References Cited

U.S. PATENT DOCUMENTS 6,107,811 A  *  8/2000  Caudill .................. C23F 13/04
324/693

\* cited by examiner

*Primary Examiner* — Jermele M Hollington
*Assistant Examiner* — Suresh K Rajaputra
(74) *Attorney, Agent, or Firm* — Cohen IP Law Group, PC; Michael N. Cohen

(57) ABSTRACT

A system for measuring the voltage potential across test coupons, reference cells and metal structures is disclosed. The system may evaluate the amount of cathodic protection that may be applied to the metal structure. A series resistor may be configured between at least one of the test coupons and the metal structure so that the at least one test coupon may be at a lower voltage potential than the metal structure.

20 Claims, 5 Drawing Sheets

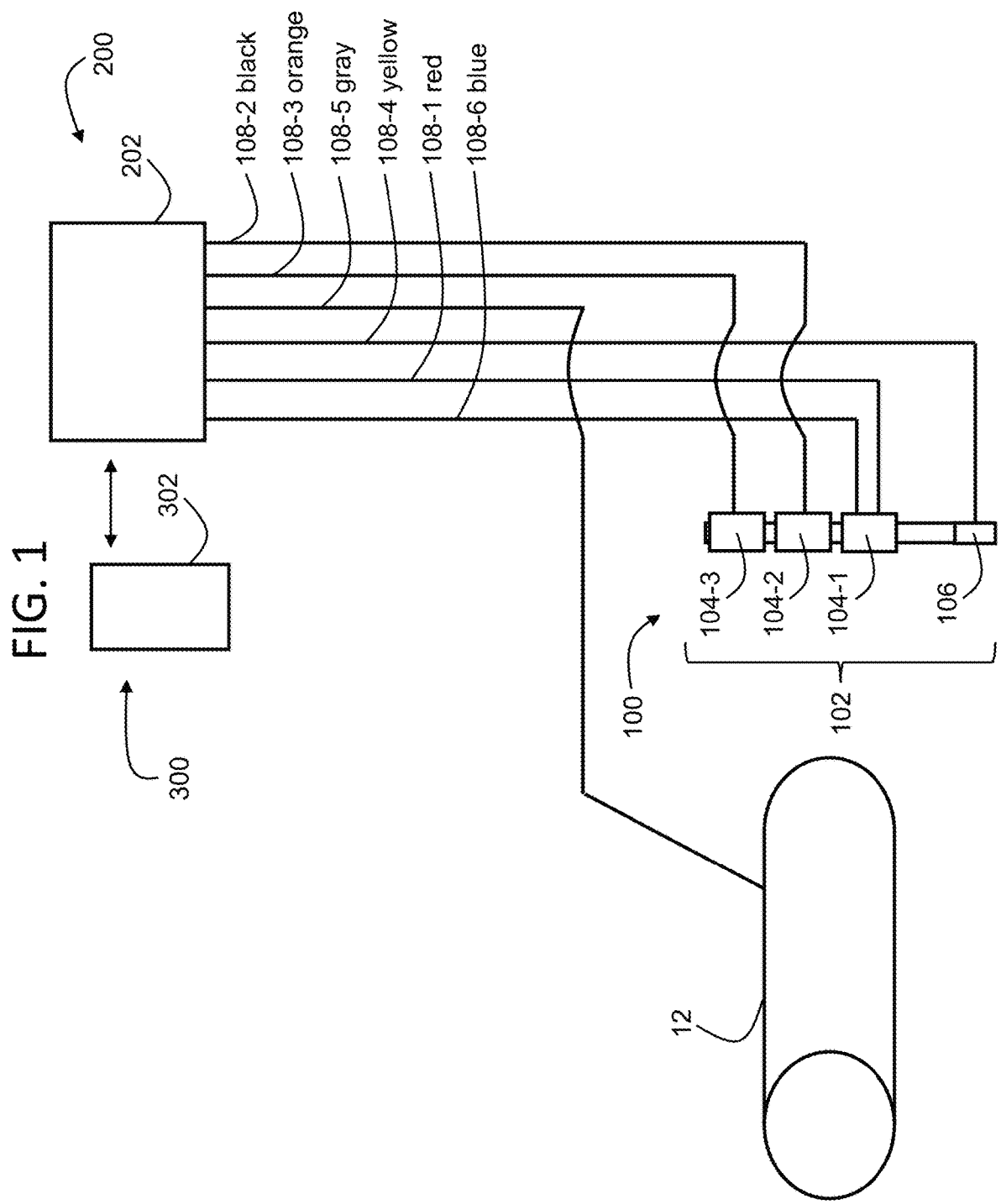

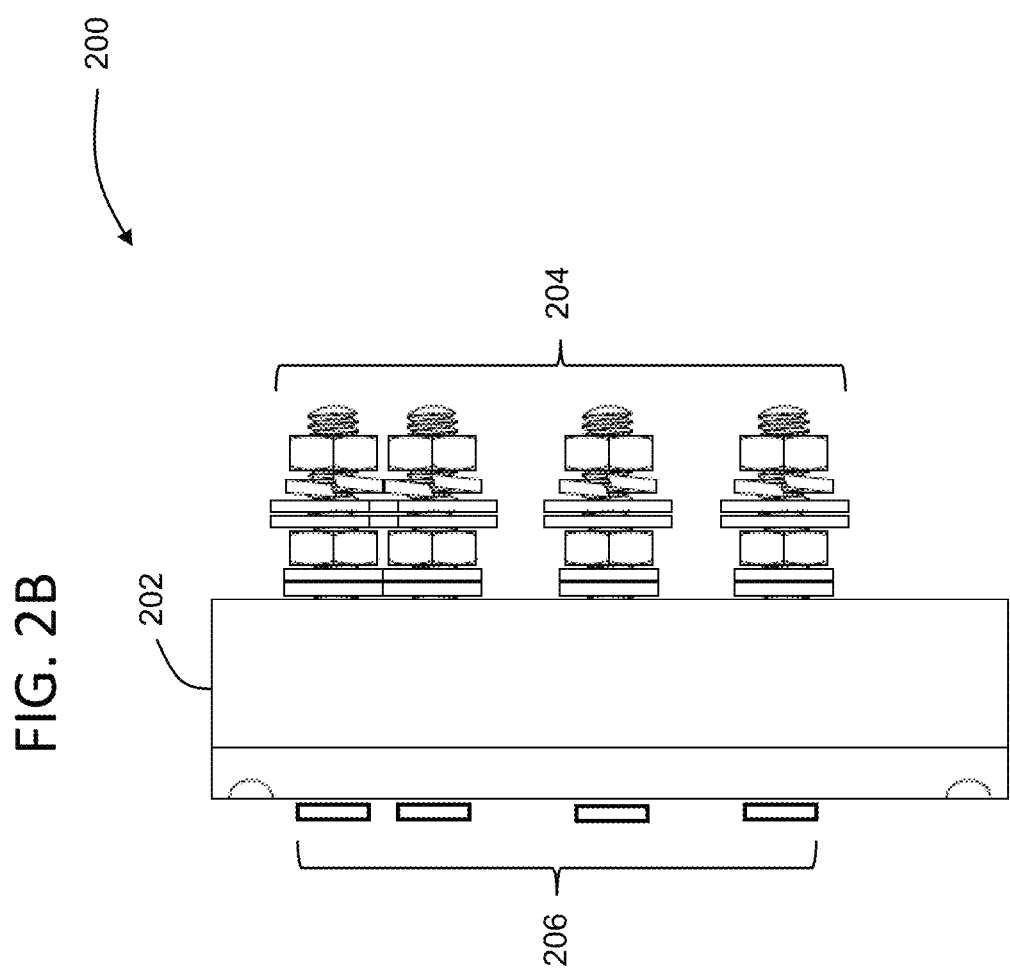

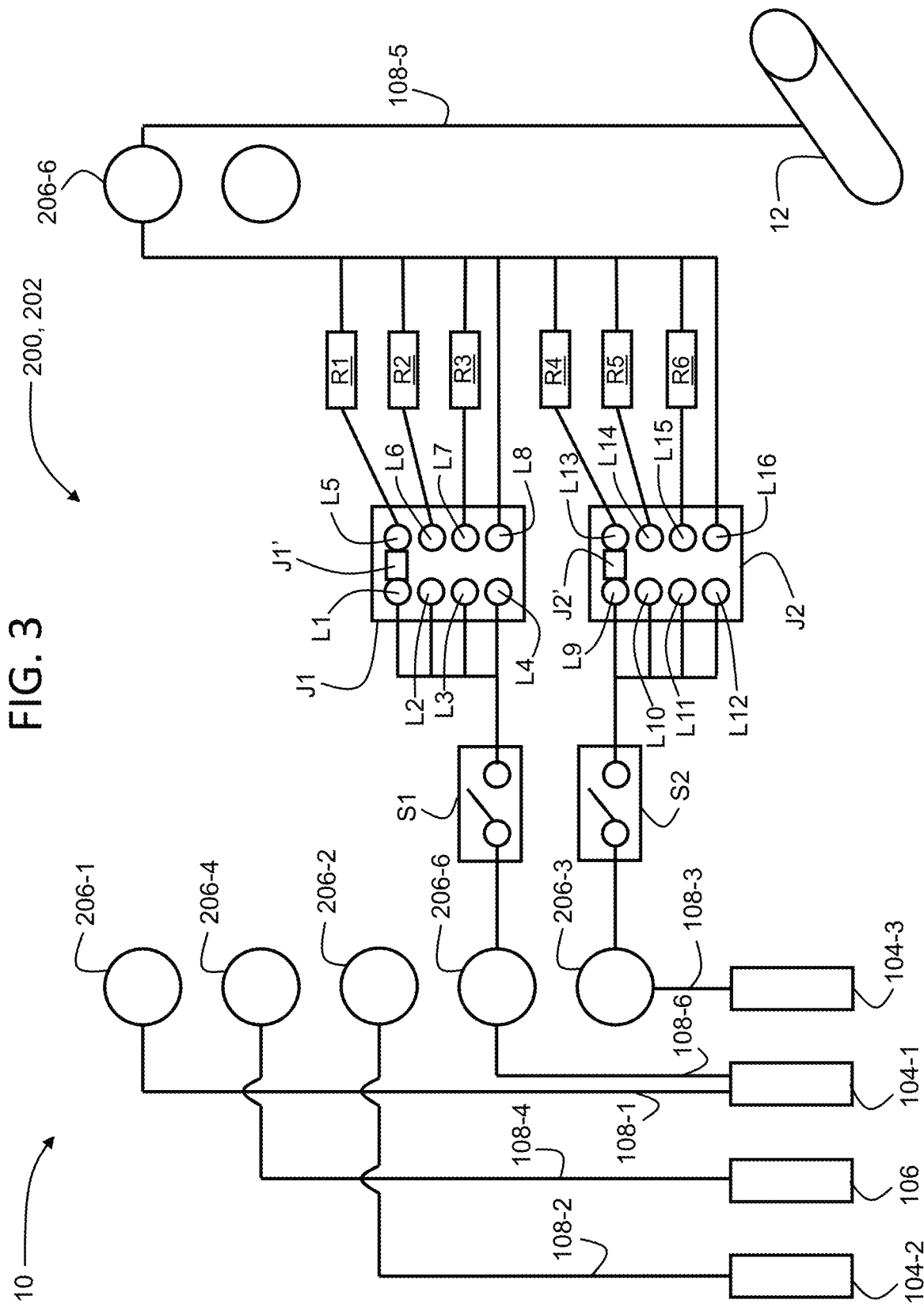

CATHODIC PROTECTION MEASUREMENT SYSTEM AND METHOD

RELATIONSHIPS TO PRIOR APPLICATIONS

This application claims priority to U.S. Provisional Application No. 62/703,355, filed Jul. 25, 2018, the entire contents of which are hereby fully incorporated herein by reference for all purposes.

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

FIELD OF THE INVENTION

This invention relates to cathodic protection of metal structures. More particularly, this invention relates to a test system for measuring the amount of cathodic protection provided such structures.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIGS. 1-3 show aspects of a measurement system according to exemplary embodiments hereof.

DETAILED DESCRIPTION OF THE EXEMPLARY EMBODIMENTS

Figure 2A:
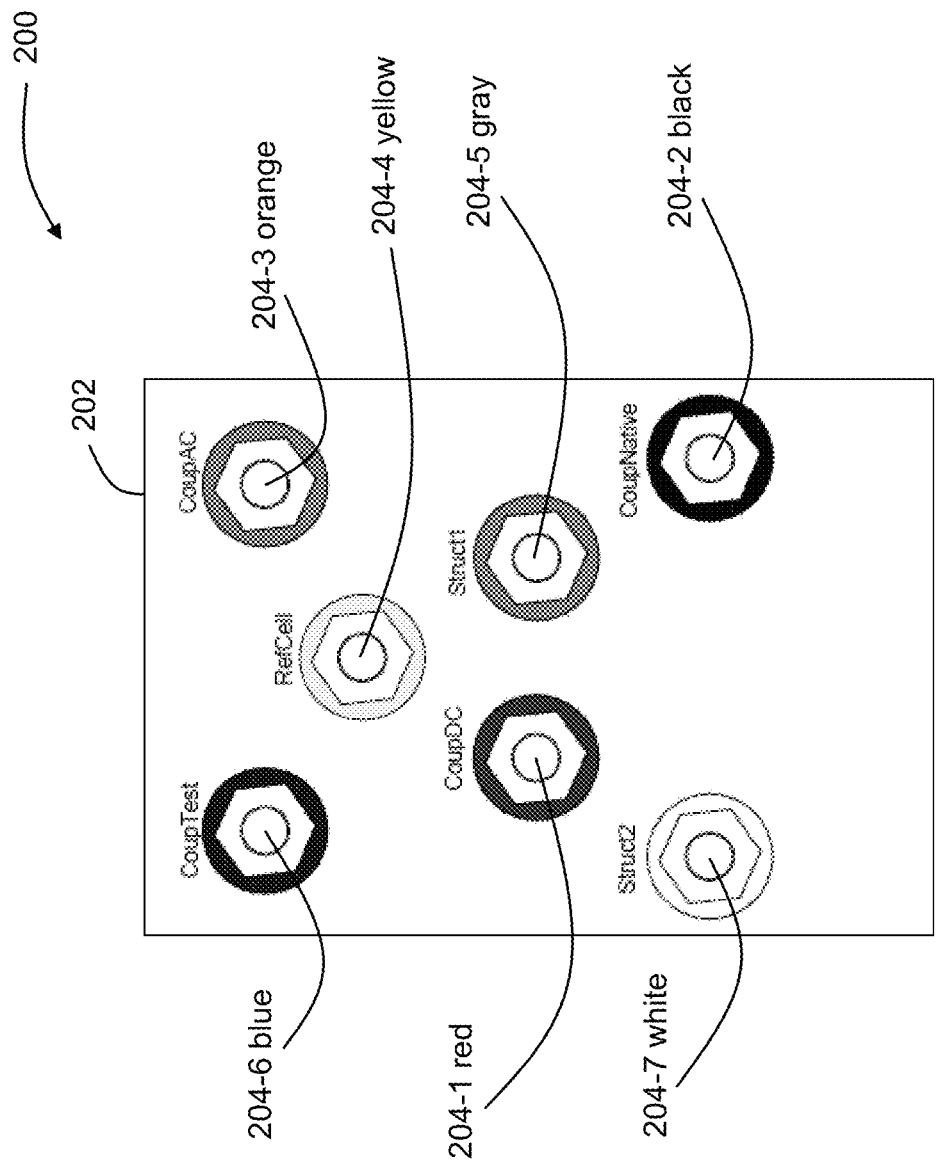

The term "mechanism," as used herein, refers to any device(s), process(es), service(s), or combination thereof. A mechanism may be implemented in hardware, software, firmware, using a special-purpose device, or any combination thereof. A mechanism may be mechanical or electrical or a combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered shorthand for the term device(s) and/or process(es) and/or service(s).

In general, the system 10 according to exemplary embodiments hereof provides equipment, devices, components, methods and procedures for monitoring, measuring, evaluating, confirming, gauging, assessing, quantifying, calculating, computing, determining and observing the amount, level and criteria for cathodic protection of a structure 12 or combination of structures 12.

The system 10 may include a test probe assembly 100 and a test and measurement connection assembly 200. The system 10 may also utilize measurement and test equipment 300, and other devices, components and elements as required by the system 10.

Cathodic Protection—Overview

Cathodic protection (CP) is a technique used to control and reduce the corrosion of metal surfaces. As is known in the art, corrosion may occur as a metal loses electrons to its surroundings. The corrosion process occurs with the removal of electrons (oxidation) of the metal and the consumption of those electrons by some other reduction reaction, such as oxygen reduction. To counteract the loss of electrons, the metal surface to be protected may be forced to be the cathode of an electrochemical cell. In this way, there may be a flow of current into the metal to be protected (the cathode) from an anode. It may be preferable that the level of current flowing into the metal structure overcome the naturally occurring loss of electrons from the metal structure so that corrosion may be controlled at a reduced level. CP may be used to protect large metal structures such as pipelines, storage tanks, drilling rigs and other types of metal structures.

One method of CP may involve connecting the metal to be protected to a more easily corroded metal to act as the anode (e.g., a galvanic anode). The more easily corroded metal (the galvanic anode) may then corrode instead of the protected metal. For this reason, the anode metal may often be referred to as a sacrificial anode.

A second method of CP may involve impressing a direct current between an inert anode and the metal structure to be protected. This method may be preferred for larger structures, or where electrolyte resistivity is high, and where galvanic anodes may not deliver enough current to provide protection. The direct current may be applied to the system by a transformer rectifier or by other sources of direct current. The anode may be buried in proximity to the metal structure and a low voltage DC may be impressed between the anode and the cathode (the metal structure to be protected) such that the desired amount of current may flow into the metal structure.

Criteria and Measurement of Cathodic Protection

In order to ensure that a particular metal structure (e.g., a pipeline) is adequately protected by CP, measurements may be made, and the results may be compared to established criteria.

There are several measurement methodologies that may be employed to ensure adequate CP. A first method may include measuring the potential between the structure to be protected and a reference electrode (e.g., a copper sulfate reference electrode or CSE), and comparing the results to established criteria. However, an IR (voltage) drop may exist in the soil or across the structure's coating that may produce an error in the pipe-to-soil (p/s) potential measurement. This error varies from pipeline to pipeline and even along the length of a given pipe. This IR-drop is affected by soil resistivity, depth of burial, coating condition, and amount of CP current. One method to correct for this IR-drop may be to interrupt the CP current and measure an off-potential immediately following interruption. The off-potential measured by interruption is an estimate of the polarized potential of the pipe. However, there are a number of problems with the off-potential method and the method may be difficult to implement.

A second methodology that may overcome the problems of the prior described method may include positioning test coupons in close vicinity of the structure, where the coupons may comprise the same material as the structure being protected. The procedure may then involve making voltage potential measurements between the coupons and a reference electrode. It may be preferable that the coupons comprise the same material as the structure but with no coating. In this way, the coupons may represent a section of the structure where the coating may be damaged, may include a defect or may not have been applied (coating holiday). The test coupons may be electrically connected to the metal structure being protected so that the coupons and the structure may be at the same potential, and therefore may receive the same amount of CP. The voltage measurement between the test coupons and the reference electrode may then represent the cathodic protection present on the metal structure being protected. The polarized potential of the coupon may not mirror the pipe polarized potential and may thereby reduce the problems described above.

The System

In one exemplary embodiment hereof as shown in FIG. 1, the system 10 may include a test probe assembly 100 that may include one or more test probes 102, each configured one or more test coupons 104-1, 104-2, 104-3, . . . 104-n (individually and collectively 104). The test probe 102 may also include a reference electrode 106. However, it is understood that the reference electrode 106 may also be included in a separate probe 102 than the coupons 104.

Each test coupon 104 may be formed in a particular size such as 1 cm$^2$, 10 cm$^2$, 100 cm$^2$ and other sizes. The voltage potential measurements may include both DC and AC measurements such that both DC and AC test coupons 104 may be required. In one exemplary implementation, it may be preferable that the test probe 102 include two 10 cm$^2$ DC coupons 104-1, 104-2 or two 100 cm$^2$ DC coupons 104-1, 104-2, or any combination thereof. It may also be preferable that the test probe 102 include at least one 1 cm$^2$ AC coupon 104-3 and at least one reference electrode 106 (also referred to as a reference cell). However, it is understood by a person of ordinary skill in the art that the test probe 102 may include any number of test coupons 104 and/or reference cells 106 of any sizes and/or types, and in any combination. The reference cell 106 may comprise Cu—CuSO$_4$, but other materials may also be used.

Each probe 102 may be buried in close proximity to the structure 12 to be protected (e.g., 8 inches, 12 inches, 18 inches, etc.). In addition, each coupon 104 of each probe 102 may be individually electrically connected to a wire 108 or other type of transmission line that may run from the coupon 104 to above ground (e.g., through a protective conduit). Each reference electrode 106 may also be similarly connected to a wire 108 that may also run to above ground through the conduit. The surface of the structure 12 being protected (e.g., the pipeline) may also be electrically connected to a wire 108 that may also run through the conduit to above ground. For the purposes of this specification, the system 10 will be described with use with a single structure. However, it is understood that more than one structure 12 may be included, and if more than one structure 12 is being protected, each structure 12 may include its own separate wire 108. It may be preferable that the wires 108 be color coded as described below but this may not be required.

In one exemplary implementation hereof, the coupon 104-1 (e.g., 10 cm$^2$ DC or 100 cm$^2$ DC) may be electrically configured with a red wire 108-1 and a blue wire 108-6 (note that each wire 108-1, 108-6 may be electrically the same or similar but connected to the coupon 104-1 separately), the coupon 104-2 (e.g., 10 cm$^2$ DC or 100 cm$^2$ DC) may be electrically configured with a black wire 108-2, the coupon 104-3 (e.g., 1 cm$^2$ AC) may be electrically configured with an orange wire 108-3, the reference electrode 106 may be electrically configured with a yellow wire 108-4, and the structure 12 may be electrically configured with a gray wire 108-5. It is clear however that any wire 108 may be any color and that the colors described above are for demonstration purposes.

The ends of the wires 108 (leads) above ground may be available to electrically connect to the measurement and test equipment (M&TE) assembly 300. The M&TE 300 may include equipment such as digital multimeters 302, voltmeters or other types of instrumentation that may read direct current (DC) and the resulting voltages, alternating current (AC) and the resulting voltages, resistance and other parameters.

In one exemplary embodiment of the system 10 hereof, the above ground leads of the wires 108 from the coupons 104, reference electrode 106 and the structure 12 may be electrically connected to a connection assembly 200. In one exemplary embodiment hereof, the connection assembly 200 may include a junction box 202 or other type of structure or device that may connectorize and manage, organize, orient, position and generally configure the leads of each wire 108 so that the wires 108 may be easily electrically connected to the M&TE 300 for electrical measurement.

In one exemplary implementation hereof as shown in FIG. 2A, the junction box 202 may include terminals 204-1, 204-2, 204-3, . . . 204-n (individually and collectively 204) that may be adapted to receive the wires 108. For example, the junction box 202 may include a red terminal 204-1 that may be configured with the red wire 108-1 from the coupon 104-1, a blue terminal 204-6 that may be configured with the blue wire 108-6 also from the coupon 104-1, a black terminal 204-2 that may be configured with the black wire 108-2 from coupon 104-2, an orange terminal 204-3 that may be configured with the orange wire 108-3 from the coupon 104-3, a yellow terminal 204-4 that may be configured with the yellow wire 108-4 from the reference electrode 106, a gray terminal 204-5 that may be configured with the gray wire 108-5 from the structure 12, and other terminals for other connections, elements, probes, structures or devices. For example, the junction box may include a terminal 204-7 that may connect to a wire 108 that may lead to a second structure 12 to be tested. It is clear that the number, color coding and types of terminals 204 described above are meant for demonstrational purposes and that any type, color, number or combination thereof of terminals 204 may be used by the junction box 202. In one exemplary implementation, the terminals 204 may include bolt/nut type terminals to be configured with each corresponding and associated wire 108, but other types of terminals 204 may also be used.

Each terminal 204 may electrically lead to a corresponding jack 206. In this way, each wire 108 that may be configured with each terminal 204 may be electrically connected to the corresponding jack 206. For example as shown in FIG. 2B, the terminals 204 may be positioned on the back of the junction box 202, the jacks 206 may be positioned on the front of the junction box 202, and the terminals 204 and the jacks 206 may be electrically connected through electrical connections within the junction box 202 (described in other sections). Note that the diagram in FIG. 2B is meant for demonstration and that it may not depict the actual number and positions of the terminals 204 and/or the jacks 206. It is also understood that the terminals 204 and the jacks 206 may be positioned anywhere on the junction box 202.

Figure 2C:
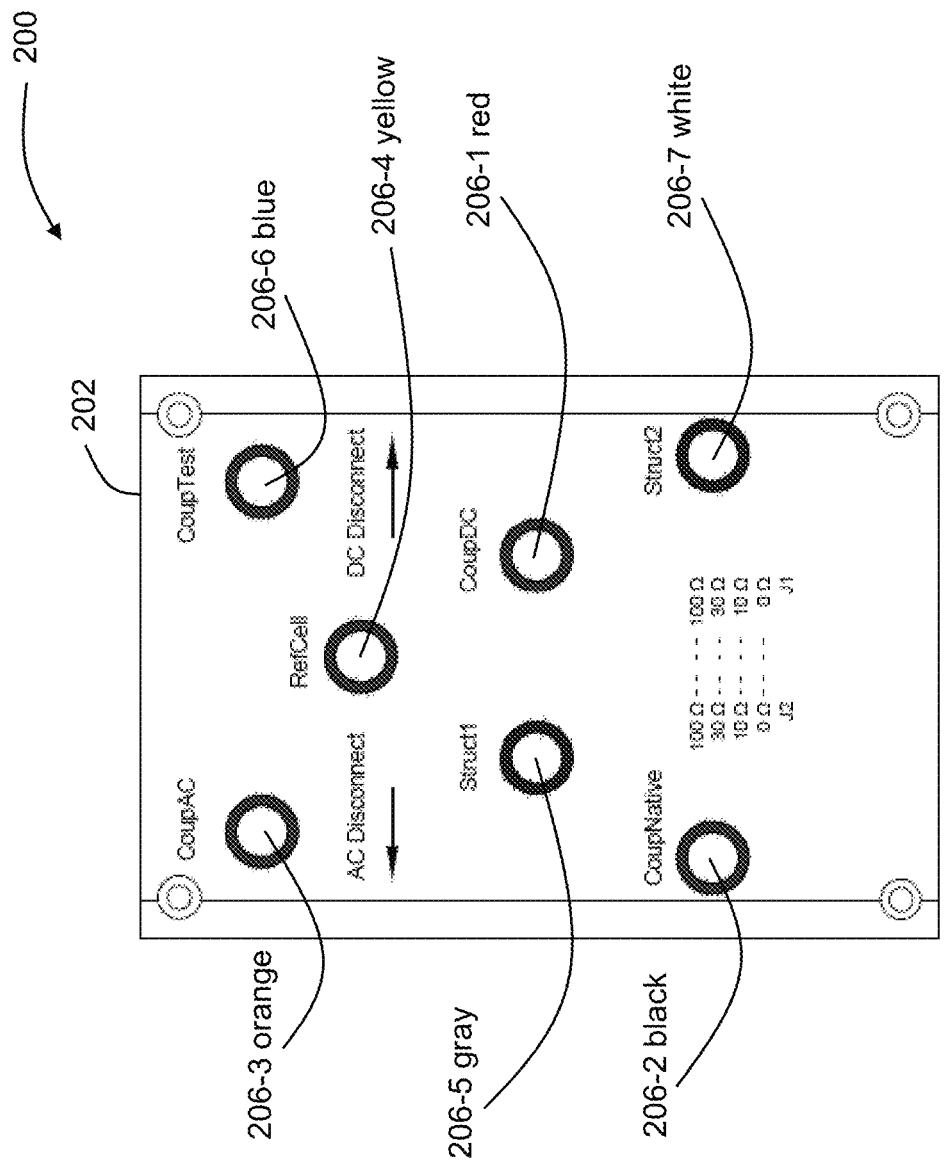

Continuing with the example above and as shown in FIG. 2C, the junction box 202 may include a jack 206-1 that may be electrically connected to the terminal 204-1, a jack 206-2 that may be electrically connected to the terminal 204-2, a jack 206-3 that may be electrically connected to the terminal 204-3, a jack 206-4 that may be electrically connected to the terminal 204-4, a jack 206-5 that may be electrically connected to the terminal 204-5, a jack 206-6 that may be electrically connected to the terminal 204-6, a jack 206-7 that may be electrically connected to the terminal 204-7, as well as any other jacks 206 that may be required by the system 10. The actual electrical connections will be described in other sections.

In one exemplary implementation, the jacks 206 may be female banana jacks 206 that may mate with male banana jacks (e.g., test leads from the M&TE 300 that may include male banana jacks), but it is understood that any type or combination of types of jacks 206 may be utilized.

It may be preferable that the test coupon 104-1 (e.g., 10 cm$^2$ DC or 100 cm$^2$ DC) and the test coupon 104-3 (e.g., 1 cm$^2$ AC) be electrically connected to the structure 12 such that the coupons 104-1, 104-3 may be at the same potential as the structure 12. In this way, the coupons 104-1, 104-3 may receive the same amount of cathodic protection as the structure 12, and the measurement of the potential across the coupons 104-1, 104-3 and the reference electrode 106 may represent a measurement between an uncoated area of surface of the structure 12 and the reference electrode 106.

This electrical connection between the coupons 104-1, 104-3 and the structure may be made within the junction box 202 when the wires 108-1, 108-3 from coupons 104-1, 104-3, and the wire 108-5 from the structure 12 are each configured with terminals 204-1, 204-3, 204-5 respectively. For example, the junction box 202 may include a transmission line that may electrically connect the terminals 204-1, 204-3, 204-5 together. This is shown in FIG. 3 and will be described in further detail in later sections.

With the probes 102, coupons 104, reference electrodes 106, structure 106, wires 108, junction box 202 and terminals 204 configured as described above, measurements may be taken across the jacks 206 using the measurement and test equipment 300 (e.g., digital voltmeter DMM 302). Measurements may be taken with respect to the structure 12, the coupons 104, the reference electrode 106 or any combination thereof. For the purposes of this specification, this will be described with reference to several examples as described below.

1. Obtaining Structure Potentials:
1.1 Measure DC Structure 1 Potential
Set DMM 302 to DC Volts
b) Connect DMM 302 (−) to RefCell Banana Jack 206-4
c) Connect DMM 302 (+) to Struct1 Banana Jack 206-5
1.2 Measure DC Structure 2 Potential
Set DMM 302 to DC Volts
b) Connect DMM 302 (−) to RefCell Banana Jack 206-4
c) Connect DMM 302 (+) to Struct2 Banana Jack 206-7
1.3 Measure AC Structure 1 Potential
Set DMM 302 to AC Volts
b) Connect 302 DMM (−) to RefCell Banana Jack 206-4
c) Connect 302 DMM (+) to Struct1 Banana Jack 206-5
1.4 Measure AC Structure 2 Potential
Set DMM 302 to AC Volts
b) Connect DMM 302 (−) to RefCell Banana Jack 206-4
c) Connect DMM 302 (+) to Struct2 Banana Jack 206-7
2. Obtaining Coupon Potentials:
2.1 Measure DC Coupon ON Potential
Set DMM 302 to DC Volts
b) Connect DMM 302 (−) to RefCell Banana Jack 206-4
c) Connect DMM 302 (+) to CoupDC Banana Jack 206-1
2.2 Measure DC Coupon instant OFF Potential
Set DMM 302 to DC Volts
b) Connect DMM 302 (−) to RefCell Banana Jack 206-4
c) Connect DMM 302 (+) to CoupDC Banana Jack 206-1
d) Activate DC Disconnect with magnet
2.3 Measure AC Coupon Potential
Set DMM 302 to AC Volts
b) Connect DMM 302 (−) to RefCell Banana Jack 206-4
c) Connect DMM 302 (+) to CoupAC Banana Jack 206-3
2.4 Measure Native Coupon Potential
Set DMM 302 to DC Volts
b) Connect DMM 302 (−) to RefCell Banana Jack 206-4
c) Connect DMM 302 (+) to CoupNative Banana Jack 206-2
3. Obtaining DC Current and Current Density
3.1 Measure DC Current (Density)—
a) Set DMM 302 to DC Amps
b) Connect DMM 302 (−) to Struct1 Banana Jack 206-5
c) Connect DMM 302 (+) to CoupTest Banana Jack 206-6
d) Activate DC Disconnect with magnet
e) Read DC Current
f) Divide current by coupon size to obtain current density
4. Obtaining AC Current and Current Density
4.1 Measure AC Current (Density)—
a) Set DMM 302 to AC Amps
b) Connect DMM 302 (−) to Struct1 Banana Jack 206-5
c) Connect DMM 302 (+) to CoupAC Banana Jack 206-3
d) Activate AC Disconnect with magnet
e) Read AC Current
f) Divide current by coupon size to obtain current density It is understood by a person of ordinary skill in the art, upon reading this specification, that the configuration and measurement examples described above are meant for demonstrational purposes, and that other configurations between the M&TE 300 and the connection assembly 200 and the test probes 100 and the structure(s) 12 may also be utilized to make other types of measurements. It is also understood that the configurations of the M&TE 300 and the connection assembly 200 and the test probes 100 and the structure(s) 12 do not limit the scope of the system 10 in any way. It is also understood that the types of measurements made and the types of M&TE 300 used do not limit the scope of the system 10 in any way.

As described above, because the test coupons 104-1, 104-3 may be electrically connected to the structure 12 and thus may exist at the same voltage potential with respect to the reference electrode 106 as the structure 12, a measurement of the voltage potential between the test coupons 104 and the reference electrode(s) 106 may simulate a measurement of the potential between the structure 12 and the reference electrode 106. In this way, the measurement results obtained by the measurements made may represent the potential across the structure 12 and the reference electrode 106, and thus the level of cathodic protection that may be present on the structure 12.

In one exemplary embodiment hereof, one or more series resistors R1, R2, R3, . . . Rn (individually and collectively R) be configured in series with the test coupon 104-1 in the path between the test coupon 104-1 and the structure 12. In this way, because the test coupon 104-1 may be a DC test coupon 104-1, there may be a voltage potential drop across the resistor(s) R such that the test coupon 104-1 may no longer be at the same potential as the structure 12, but instead may be at a slightly lower potential due to the potential drop across the resistor(s) R. This lower voltage potential may result in less cathodic protection applied to the coupon 104-1.

Accordingly, the voltage potential reading (e.g., the measurements as described above) across the test coupon 104-1 and the reference electrode 106 may be slightly less than the potential that actually exists across the structure 12 and the reference electrode 106. In this way, the measurement of the potential across the test coupon 104-1 and the reference electrode 106 may be a worse than actual value, or a worst-case representation of the voltage potential between the structure and the reference electrode.

The potential drop across the resistor(s) R may depend on the value of the resistors R and may follow the equation of Ohm's Law:

$$V=I*R$$

where

V=the voltage drop (in voltage V)
I=the current flowing across the resistors R (in amps A)
R=the resistive value of the resistor(s) R (in ohms Ω).

In one exemplary embodiment hereof, one or more series resistors R1, R2, R3, . . . Rn (individually and collectively R) be configured in series with the test coupon 104-3 in the path between the test coupons 104-1, 104-3 and the structure 12. The purpose for the series resistors R may be to allow for voltage measurements to be taken across the resistors, such that by knowing the resistance value of the resistors R, the current across the resistors R may be calculated. In this way, the current and the current densities may be calculated by using Ohm's Law as described above.

In one exemplary embodiment hereof as shown in FIG. 3, the junction box 202 may include one or more resistors R built into the junction box 202 that may be chosen to be in the series path between the test coupons 104-1, 104-3 and the structure 12. In the exemplary implementation shown, the resistors R may include R1 (100Ω), R2 (33Ω) R3 (10Ω), R4 (100Ω), R5 (33Ω) and R6 (10Ω). As shown in the figure, the resistors R1, R2 and R3 may be in series in the path between coupon 104-1 and the structure 12 (when the jumper J1' may be in place as described below), and the resistors R4, R5 and R6 may be in series in the path between coupon 104-3 and the structure 12 (when the jumper J2' may be in place as described below). It is understood by a person of ordinary skill in the art that the resistive values of the resistors R shown above are meant for demonstrational purposes and that the system 10 may utilize any values of resistors R as desired. It is also understood that the scope of the system 10 is not limited in any way by the resistors R and/or the resistor values that the system 10 may use.

In one exemplary embodiment hereof, the junction box 202 may include a jumper junction J1 in series between the coupon 104-1 and the resistors R1, R2 and R3. The jumper junction J1 may include a number of internal leads that when connected may form an electrical path through the junction J1. For example, the jumper junction J1 may include input leads L1-L4 and output leads L5-L8. Lead L1 and lead L5 may form a pair so that when lead L1 and lead L5 are electrically connected, the connection may form an electrical path through the jumper junction J1. Similarly, lead L2 and lead L6 may form a pair so that when lead L2 and lead L6 are electrically connected, the connection may form an electrical path through the jumper junction J1, lead L3 and lead L7 may form a pair so that when lead L3 and lead L7 are electrically connected, the connection may form an electrical path through the jumper junction J1, and lead L4 and lead L8 may form a pair so that when lead L4 and lead L8 are electrically connected, the connection may form an electrical path through the jumper junction J1.

In one exemplary embodiment hereof, a jumper J1' may be placed between one set of the lead pairs L1/L5, L2/L6, L3/L7 or L4/L8. In this way, the jumper J1' may form an electrical connection between the lead pair thereby providing an electrical path through the junction J1. Once the jumper J1' may form an electrical path through the junction J1 across a particular lead pair, the respective resistor R associated with the connected lead pair may be placed in series in the path between the coupon 104-1 and the structure 12 as shown.

For example, when the jumper J1' may be placed across the lead pair L1/L5, the resistor R1 may be placed in the path. Similarly, when the jumper J1' may be placed across the lead pair L2/L6, the resistor R2 may be placed in the path, when the jumper J1' may be placed across the lead pair L3/L7, the resistor R3 may be placed in the path, and when the jumper J1' may be placed across the lead pair L4/L8, a short circuit may be placed in the path (no resistor R). In the case of connecting lead pair L4/L8, because no resistor R may be in this path, there may be no voltage potential drop between the test coupon 104-1 and the structure 12 such that the test coupon 104-1 may be at the same voltage potential as the structure 12.

In one exemplary embodiment hereof, the junction box 202 may include a jumper junction J2 in series between the coupon 104-3 and the resistors R4, R5 and R6. The jumper junction J2 may include a number of internal leads that when connected may form an electrical path through the junction J2. For example, the jumper junction J2 may include input leads L9-L12 and output leads L13-L16. Lead L9 and lead L13 may form a pair so that when lead L9 and lead L13 are electrically connected, the connection may form an electrical path through the jumper junction J2. Similarly, lead L10 and lead L14 may form a pair so that when lead L10 and lead L14 are electrically connected, the connection may form an electrical path through the jumper junction J2, lead L11 and lead L15 may form a pair so that when lead L11 and lead L15 are electrically connected, the connection may form an electrical path through the jumper junction J2, and lead L2 and lead L16 may form a pair so that when lead L12 and lead L16 are electrically connected, the connection may form an electrical path through the jumper junction J2.

In one exemplary embodiment hereof, a jumper J2' may be placed between one set of the lead pairs L9/L13, L10/L14, L11/L15 or L12/L16. In this way, the jumper J2' may form an electrical connection between the lead pair thereby providing an electrical path through the junction J2. Once the jumper J2' may form an electrical path through the junction J2 across a particular lead pair, the respective resistor R associated with the connected lead pair may be placed in series in the path between the coupon 104-3 and the structure 12 as shown.

For example, when the jumper J2' may be placed across the lead pair L9/L13, the resistor R4 may be placed in the path. Similarly, when the jumper J2' may be placed across the lead pair L10/L14, the resistor R5 may be placed in the path, when the jumper J2' may be placed across the lead pair L11/L15, the resistor R6 may be placed in the path, and when the jumper J2' may be placed across the lead pair L12/L16, a short circuit may be placed in the path (no resistor R). In the case of connecting lead pair L12/L16, because no resistor R may be in this path, there may be no voltage potential drop between the test coupon 104-3 and the structure 12 such that the test coupon 104-3 may be at the same voltage potential as the structure 12.

In one exemplary embodiment hereof, the jumper junction J1 and/or the jumper junction J2 may include (or be replaced by) one or more relays, switches, multiplexers or other types of devices or mechanisms that may place the resistors R1, R2 and R3 in series with the coupon 104-1, and/or the resistors R4, R5 and R6 in series with the coupon 104-3. The relay(s) may be controlled via automatic control (e.g., voltages), by manual control or by any combination thereof. In this way, the system 10 may be an automated test system. Note that is if a voltage drop may occur across the switch(s) or other mechanism(s) used to place the resistors R in series with the test coupons, it may be preferable to characterize this voltage drop and include it in the total path voltage drop between the test coupons and the structure 12.

It is understood by a person of ordinary skill in the art, upon reading this specification, that the system 10 may include any number, type or value of resistors R that may be placed in series with any of the test coupons 104 and structures 12, and that the resistors R may be placed, positioned or configured in series with any of the coupons 104 and structures 12 by any mechanism or combination of different mechanisms. For example, a variable resistor mechanism may be used to provide a variable amount of resistance. It is also understood that some or all of the resistors R may be placed in parallel with any of the coupons 104 and/or any structures 12. It is also understood that any other device, component, or element, such as capacitors, inductors or any other types or combination of types of devices, components or elements may also be placed by the system 10 in series and/or in parallel between any of the coupons 104 and any structures 12 using similar or dissimilar junctions and jumpers as described above. It is also understood that any device, component, or element, such as resistors, capacitors, inductors or any other types or combination of types of devices, components or elements may also be placed by the system 10 in series and/or in parallel between the reference electrode(s) 106 and any of the coupons 104 and any structures 12.

The junction box 202 may also include at least one switch S1 in series in the path between the test coupon 104-1 and the jumper junction J1, and at least one switch S2 in series in the path between the test coupon 104-3 and the jumper junction J2. In this way, the circuit may be opened as desired to electrically disconnect the test coupon 104-1 and/or the test coupon 104-3 from the structure 12. This may be desirable for making DC coupon instant off measurements, DC current and current density measurements, AC current and current density measurements, as well as other types of measurements. The switches S may be activated using magnets, voltages or by other methods.

It may be preferable that the switches S be reed switches that may be activated by applying a magnet to the switches S, and deactivated by removing the magnet from the switches S. The purpose for using this type of switch may be to avoid switches that may inadvertently cause a spark. It should be noted that the system 10 may be installed and implemented in an environment that may be sensitive to sparks such as an oil rig, a tank containing flammable liquid, a pipeline containing flammable liquid, or any other facility or environment that may be sensitive to sparks. By using reed switches that may be activated by magnets, sparks may be avoided.

It may be preferable that once the junction box 202 may be fully configured, potting and/or resin may be added to the inner cavity of the junction box 202 to seal the electrical connections and components therein and to provide protection from moister, corrosive agents, shock and vibration. The potting or resin may also isolate any sparks that may occur in the junction box 202 from the outside environment. The potting and/or resin may include thermosetting plastics, silicon rubber gels, epoxy, polyurethane or other types of materials. Note that the potting and/or resin may also be added to the inner cavity of the junction box 202 prior to the deployment of the junction box 202 into the field. In other exemplary embodiments, some of the potting and/or resin may be added to portions of the cavity prior to the deployment of the junction box 202, and some of the potting and/or resin may be added to portions of the cavity after the deployment of the junction box 202.

Where a process is described herein, those of ordinary skill in the art will appreciate that the process may operate without any user intervention. In another embodiment, the process includes some human intervention (e.g., a step is performed by or with the assistance of a human).

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

As used in this description, the term "portion" means some or all. So, for example, "A portion of X" may include some of "X" or all of "X". In the context of a conversation, the term "portion" means some or all of the conversation.

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first," "second," and so on, in the description and claims, are used to distinguish or identify, and not to show a serial or numerical limitation. Similarly, letter labels (e.g., "(A)", "(B)", "(C)", and so on, or "(a)", "(b)", and so on) and/or numbers (e.g., "(i)", "(ii)", and so on) are used to assist in readability and to help distinguish and/or identify, and are not intended to be otherwise limiting or to impose or imply any serial or numerical limitations or orderings. Similarly, words such as "particular," "specific," "certain," and "given," in the description and claims, if used, are to distinguish or identify, and are not intended to be otherwise limiting.

As used herein, including in the claims, the terms "multiple" and "plurality" mean "two or more," and include the case of "two." Thus, e.g., the phrase "multiple ABCs," means "two or more ABCs," and includes "two ABCs." Similarly, e.g., the phrase "multiple PQRs," means "two or more PQRs," and includes "two PQRs."

The present invention also covers the exact terms, features, values and ranges, etc. in case these terms, features, values and ranges etc. are used in conjunction with terms such as about, around, generally, substantially, essentially, at least etc. (i.e., "about 3" or "approximately 3" shall also cover exactly 3 or "substantially constant" shall also cover exactly constant).

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

The present invention also covers the exact terms, features, values and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance", "such as", "for example" ("e.g.,") and the like, is merely intended to better illustrate the invention and does not indicate a limitation on the scope of the invention unless specifically so claimed.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

We claim:

1. A system for measuring cathodic protection potential of a structure, the system comprising:
    a connection assembly;
    a first test coupon electrically configured with the connection assembly and in close proximity to the structure;
    at least one reference cell electrically configured with the connection assembly and in close proximity to the structure;
    a line providing an electrical connection between the structure and the connection assembly; and
    a first resistor configured with the connection assembly and placeable in series between the first test coupon and the structure, and that drops the overall voltage potential between the first test coupon and the structure;
    wherein when the first resistor is placed in series between the first test coupon and the structure a voltage potential is measured between the first test coupon and the at least one reference cell.

2. The system of claim 1 wherein the first test coupon is electrically configured at a first terminal on the connection assembly, the at least one reference cell is electrically configured at a second terminal on the connection assembly, and the structure is electrically configured at a third terminal on the connection assembly.

3. The system of claim 2 wherein the first resistor is configured in series between the first terminal and the third terminal along a first electrical path.

4. The system of claim 2 further comprising a first jumper junction in series between the first terminal and the first resistor along the first electrical path.

5. The system of claim 4 further comprising a first jumper used to close the first jumper junction thereby electrically connecting the first terminal with the first resistor.

6. The system of claim 5 wherein the first resistor provides a potential drop between the first terminal and the third terminal.

7. The system of claim 2 further comprising a second resistor configured in series between the first terminal and the third terminal along a second electrical path.

8. The system of claim 7 further comprising a second jumper junction in series between the first terminal and the second resistor along the second electrical path.

9. The system of claim 8 further comprising a first jumper used to close the first jumper junction thereby electrically connecting the first terminal with the second resistor.

10. The system of claim 9 wherein the second resistor provides a potential drop between the first terminal and the third terminal.

11. The system of claim 2 further comprising a second test coupon configured with the connection assembly at a fourth terminal on the connection assembly, a third resistor configured in series between the third terminal and the fourth terminal, a second jumper junction configured in series between fourth terminal and the third resistor, and a second jumper used to close the second jumper junction thereby electrically connecting the fourth terminal to the third resistor.

12. A method of measuring cathodic protection potential of a structure, the method comprising:
    (A) providing a connection assembly;
    (B) electrically configuring a first test coupon with the connection assembly and placing the first test coupon in close proximity to the structure;
    (C) electrically configuring at least one reference cell with the connection assembly and placing the at least one reference cell in close proximity to the structure;
    (D) providing an electrical connection between the structure and the connection assembly;
    (E) electrically configuring a first resistor with the connection assembly in series between the first test coupon and the structure so that the first resistor drops the overall voltage potential between the first test coupon and the structure;
    (F) measuring the voltage potential between the first test coupon and the at least one reference cell.

13. The method of claim 12 further comprising in step (B):
    (B)(1) electrically configuring the first test coupon at a first terminal on the connection assembly;
    and further comprising in step (C):
    (C)(1): electrically configuring the at least one reference cell at a second terminal on the connection assembly;
    and further comprising in step (D):
    (D)(1) providing the electrical connection at a third terminal on the connection assembly;
    and further comprising in step (E);

(E)(1) electrically configuring the first resistor in series between the first terminal and the third terminal along a first electrical path.

14. The method of claim 13 further comprising the step:

(E)(2) electrically configuring a first jumper junction in series between the first terminal and the first resistor along the first electrical path.

15. The method of claim 14 further comprising the step:

(E)(3) using a first jumper to close the first jumper junction thereby electrically connecting the first terminal to the first resistor.

16. The method of claim 15 wherein the first resistor provides a potential drop between the first terminal and the third terminal.

17. The method of claim 13 further comprising the step:

(E)(4) electrically configuring a second resistor in series between the first terminal and the third terminal along a second electrical path.

18. The method of claim 17 further comprising the step:

(E)(5) electrically configuring a second jumper junction in series between the first terminal and the second resistor along the second electrical path.

19. The method of claim 18 further comprising the step:

(E)(6) using a second jumper to close the second jumper junction thereby electrically connecting the first terminal with the second resistor.

20. The system of claim 19 wherein the second resistor provides a potential drop between the first terminal and the third terminal.

* * * * *